(12) United States Patent
Kondou et al.

(10) Patent No.: US 8,315,496 B2
(45) Date of Patent: Nov. 20, 2012

(54) OPTICAL ELEMENT

(75) Inventors: Katsutoshi Kondou, Chiyoda-ku (JP);
Susumu Murata, Chiyoda-ku (JP);
Junichiro Ichikawa, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 305 days.

(21) Appl. No.: 12/733,875

(22) PCT Filed: Sep. 26, 2008

(86) PCT No.: PCT/JP2008/067408
§ 371 (c)(1),
(2), (4) Date: Jun. 4, 2010

(87) PCT Pub. No.: WO2009/041568
PCT Pub. Date: Apr. 2, 2009

(65) Prior Publication Data
US 2010/0247025 A1 Sep. 30, 2010

(30) Foreign Application Priority Data
Sep. 28, 2007 (JP) ................................ 2007-256578

(51) Int. Cl.
*G02F 1/295* (2006.01)
*G02B 6/10* (2006.01)
*G02B 26/00* (2006.01)

(52) U.S. Cl. ............ 385/129; 385/8; 359/290; 359/291; 359/294; 359/295

(58) Field of Classification Search ........................ None
See application file for complete search history.

(56) References Cited

U.S. PATENT DOCUMENTS

| 4,085,501 | A |   | 4/1978 | Currie |
|---|---|---|---|---|
| 4,626,920 | A | * | 12/1986 | Glenn ............................. 348/775 |
| 5,018,812 | A |   | 5/1991 | Fukuda |
| 5,815,610 | A | * | 9/1998 | Tokano et al. ...................... 385/2 |
| 6,453,086 | B1 | * | 9/2002 | Tarazona ........................ 385/20 |
| 6,654,188 | B2 | * | 11/2003 | Stone ............................. 359/888 |
| 6,930,817 | B2 | * | 8/2005 | Srinivasan et al. ............. 359/295 |
| 6,950,227 | B2 | * | 9/2005 | Schrader ........................ 359/320 |
| 7,002,731 | B2 | * | 2/2006 | Mitomi et al. ................. 359/322 |
| 2002/0172447 | A1 | * | 11/2002 | MacDonald et al. ........... 385/13 |
| 2002/0187339 | A1 |   | 12/2002 | Noda et al. |
| 2003/0035611 | A1 | * | 2/2003 | Shi ................................. 385/16 |

(Continued)

FOREIGN PATENT DOCUMENTS
JP  60-051699 A  3/1985
(Continued)

*Primary Examiner* — Rhonda Peace
(74) *Attorney, Agent, or Firm* — Chapman and Cutler LLP

(57) ABSTRACT

Disclosed is an optical element which includes a support substrate and a thin plate of single crystal stacked on the support substrate through a thermoplastic adhesive, having the advantages of easily regulating the phase of light waves and restoring the regulated state to the original state. The optical element includes a support substrate 4 and a thin plate 1 of single crystal stacked on the support substrate 4 through a thermoplastic adhesive 3. The optical characteristics of the optical element are regulated by applying stress within an elastic limit to at least a part of the thin plate in a state where the thermoplastic adhesive is softened by heating the optical element, forming a concavo-convex part 10 in the thin plate, and then cooling the optical element to fix the concavo-convex part.

7 Claims, 2 Drawing Sheets

U.S. PATENT DOCUMENTS

| | | | |
|---|---|---|---|
| 2004/0126082 A1* | 7/2004 | Stone | 385/140 |
| 2004/0212869 A1 | 10/2004 | Srinivasan et al. | |
| 2006/0088239 A1* | 4/2006 | Aalto et al. | 385/1 |
| 2010/0247025 A1* | 9/2010 | Kondou et al. | 385/3 |

FOREIGN PATENT DOCUMENTS

| | | |
|---|---|---|
| JP | 63-287819 A | 11/1988 |
| JP | 3-087074 A | 4/1991 |
| JP | 4-034516 A | 2/1992 |
| JP | 4-162022 A | 6/1992 |
| JP | 7-120710 A | 5/1995 |
| JP | 7-218881 A | 8/1995 |
| JP | 11-271552 A | 10/1999 |
| JP | 2002-337274 A | 11/2002 |
| JP | 2004-326114 A | 11/2004 |
| JP | 2005-039131 A | 2/2005 |

* cited by examiner

OPTICAL ELEMENT

TECHNICAL FIELD

The present invention relates to an optical element, and in particular, to an optical element including a support substrate and a thin plate of single crystal stacked on the support substrate through a thermoplastic adhesive.

BACKGROUND ART

In recent years, in the fields of optical communication or optical measurement, various optical elements for controlling the intensity or phase of light waves are used. In an optical fiber communication or optical measurement system, optical elements having optical waveguides are used for necessary optical processing from the viewpoint of ease of integration, high control efficiency, and the like. Of these, an optical element having a Mach-Zehnder type optical waveguide is excellent in high-speed capability and stability of the modulation operation of light waves.

In an optical element which uses a substrate having an electro-optical effect, such as lithium niobate, the substrate itself is formed of a thin plate having a thickness equal to or smaller than 50 µm so as to realize the wide bandwidth of the drive frequency of the optical element or to reduce the drive voltage of the optical element. The thinned substrate has weak mechanical strength, so a support substrate is usually bonded to the rear surface of the substrate through an adhesive layer (see Patent Document 1).

Patent Document 1: JP-A-2002-337274

Meanwhile, in an optical element using an optical waveguide, when the manufactured optical element may not achieve desired characteristics due to manufacturing errors or the like, or when the characteristics of the optical element are actively changed, the phase of light waves propagating inside the optical waveguide is regulated. A method of regulating the phase of light waves basically regulates the refractive index of the optical waveguide itself or its periphery (a region which reacts with the propagating light waves). Specifically, there are a method of forming a groove on a substrate as described in Patent Document 2, a method using a photorefractive effect or a photo-elastic effect, a method of forming, on an optical waveguide, a material having a refractive index different from the optical waveguide, and the like.

Patent Document 2: JP-A-11-271552

However, in the existing phase regulation method, a complex and expensive regulation device is necessary at the time of regulation, and after regulation has been done, it is difficult to restore the regulated state to the original state and to regulate the phase of light waves again. For this reason, the regulation operation may be further complicated and may become troublesome.

DISCLOSURE OF INVENTION

Technical Problem

The invention has been finalized in order to solve the above-described problems, and it is an object of the invention to provide an optical element including a support substrate and a thin plate of single crystal stacked on the support substrate through a thermoplastic adhesive, having the advantages of easily regulating the phase of light waves and restoring the regulated state to the original state.

Technical Solution

A first aspect of the invention provides an optical element. The optical element includes a support substrate and a thin plate of single crystal stacked on the support substrate through a thermoplastic adhesive. The optical characteristics of the optical element are regulated by applying stress within an elastic limit to at least a part of the thin plate in a state where the thermoplastic adhesive is softened by heating the optical element, forming a concavo-convex part in the thin plate, and then cooling the optical element to fix the concavo-convex part.

According to a second aspect of the invention, the optical element according to the first aspect of the invention may further include fixing means for maintaining the shape of the concavo-convex part formed in the thin plate of single crystal. The fixing means may be formed of a material having thermoplasticity lower than that of the thermoplastic adhesive or a material having no thermoplasticity.

According to a third aspect of the invention, in the optical element according to the second aspect of the invention, the fixing means may be provided in contact with the concavo-convex part or above the concavo-convex part.

According to a fourth aspect of the invention, in the optical element according to any one of the first to third aspects of the invention, an optical waveguide may be formed in the thin plate of single crystal.

According to a fifth aspect of the invention, in the optical element according to the fourth aspect of the invention, the concavo-convex part may be formed above or near the optical waveguide to regulate the optical characteristics.

According to a sixth aspect of the invention, in the optical element according to the fifth aspect of the invention, the optical waveguide may be a Mach-Zehnder type optical waveguide.

According to a seventh aspect of the invention, in the optical element according to the sixth aspect of the invention, the concavo-convex part may be arranged near or above two branch waveguides constituting the Mach-Zehnder type optical waveguide so as to regulate the phase of light propagating through the branch waveguides.

An eighth aspect of the invention provides an optical element. The optical element includes a support substrate and a thin plate of single crystal stacked on the support substrate through a thermoplastic adhesive. The thin plate has a thickness equal to or smaller than 50 µm, stress within an elastic limit is applied to at least a part of the thin plate, a circular concavo-convex part having a radius r and a depth d is formed, and the shape of the concavo-convex part satisfies the condition of the following expression:

(Expression)

$$\tan[2d/(d^2+r^2)\times(r+\pi/kn)] \leq 2rd/(r^2-d^2)$$

In the expression, k is a wave number under vacuum, and n is a refractive index.

ADVANTAGEOUS EFFECTS

According to the first aspect of the invention, the optical element includes the support substrate and the thin plate of single crystal stacked on the support substrate through the thermoplastic adhesive. The optical characteristics of the optical element are regulated by applying stress within the elastic limit to at least a part of the thin plate in a state where the thermoplastic adhesive is softened by heating the optical element, forming the concavo-convex part in the thin plate, and then cooling the optical element to fix the concavo-convex part. For this reason, the concavo-convex part can be easily formed in the thin plate by locally pressing the thin plate while entirely or locally heating the thermoplastic adhesive, and reducing the thermoplastic adhesive to a curing temperature in the pressed state. The concavo-convex part causes a part, such as an optical waveguide, for guiding light waves to be curved, which results in change in a spatial optical path length, or causes change in the refractive index of the relevant part, which results in change in a substantial optical path length. As a result, the phase of light waves can be easily regulated.

The formed concavo-convex part can be restored to the original state by heating the thermoplastic adhesive, and the concavo-convex part can be repeatedly formed many times to regulate the phase of light waves.

According to the second aspect of the invention, the optical element further includes the fixing means for maintaining the shape of the concavo-convex part formed in the thin plate of single crystal. The fixing means is formed of a material having thermoplasticity lower than that of the thermoplastic adhesive or a material having no thermoplasticity. For this reason, when the optical element is being driven, even if the optical element is heated and reaches a temperature at which the thermoplastic adhesive is softened, the fixing means prevents restoration of the concavo-convex part to the original state. Further, even when the environmental temperature of the optical element or its periphery changes, and the thermoplastic adhesive is softened, the shape of the concavo-convex part can be stably maintained since the fixing means has high softening temperature or the fixing means is not softened.

According to the third aspect of the invention, the fixing means is provided in contact with the concavo-convex part or above the concavo-convex part. Therefore, restoration of the concavo-convex part to the original state can be effectively suppressed.

According to the fourth aspect of the invention, the optical waveguide is formed in the thin plate of single crystal. For this reason, the phase of light waves propagating through the optical waveguide can be regulated in various ways by selecting the location of the concavo-convex part or the size of the concavo-convex part with respect to the optical waveguide, and the number of concavo-convex parts.

According to the fifth aspect of the invention, the concavo-convex part is formed above or near the optical waveguide to regulate the optical characteristics. Therefore, the phase of light waves can be more effectively regulated.

According to the sixth aspect of the invention, the optical waveguide is a Mach-Zehnder type optical waveguide. Therefore, the operation point of an optical modulator or the like using a Mach-Zehnder type optical waveguide can be easily and repeatedly regulated by using the invention.

According to the seventh aspect of the invention, the concavo-convex part is arranged near or above the two branch waveguides constituting the Mach-Zehnder type optical waveguide so as to regulate the phase of light propagating through the branch waveguides. Therefore, the phase difference between light waves propagating through the two branch waveguides can be more effectively regulated.

According to the eighth aspect of the invention, the optical element includes the support substrate and the thin plate of single crystal stacked on the support substrate through the thermoplastic adhesive. The thin plate has a thickness equal to or smaller than 50 μm, stress within the elastic limit is applied to at least a part of the thin plate, the circular concavo-convex part having a radius r and a depth d is formed, and the shape of the concavo-convex part satisfies the condition of the following expression. Therefore, change in the phase due to the concavo-convex part can be set within one cycle of the light waves, and for example, control of the bias point of an optical modulator can be sufficiently regulated.

(Expression)

$$\tan[2d/(d^2+r^2)\times(r+\pi/kn)] \leq 2rd/(r^2-d^2)$$

In the expression, k is a wave number under vacuum, and n is a refractive index.

BRIEF DESCRIPTIONS OF DRAWINGS

EXPLANATION OF REFERENCES

| 1: | THIN PLATE |
|---|---|
| 2: | OPTICAL WAVEGUIDE |
| 3: | ADHESIVE LAYER (THERMOPLASTIC ADHESIVE) |
| 4: | SUPPORT SUBSTRATE |
| 5: | FIXING MEANS |
| 10 to 12: | CONCAVO-CONVEX PART |
| 21, 22: | BRANCH WAVEGUIDE |

BEST MODE FOR CARRYING OUT THE INVENTION

Figure 1:
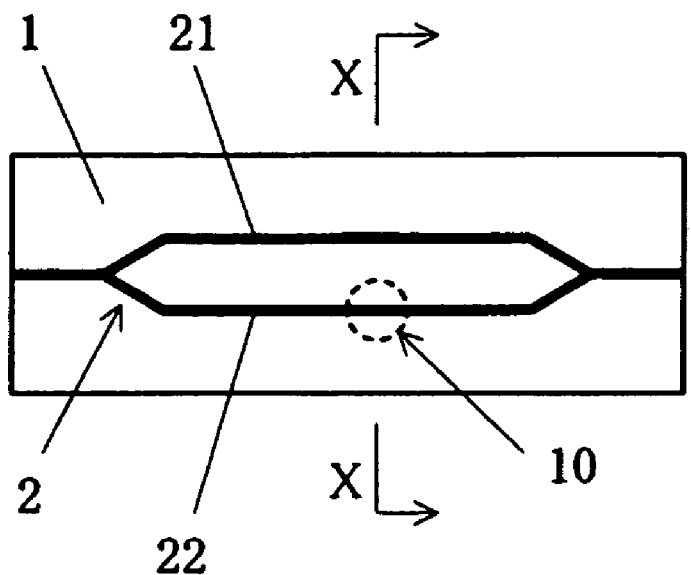
FIG. 1 is a plan view of an optical element of the invention.
Figure 2:
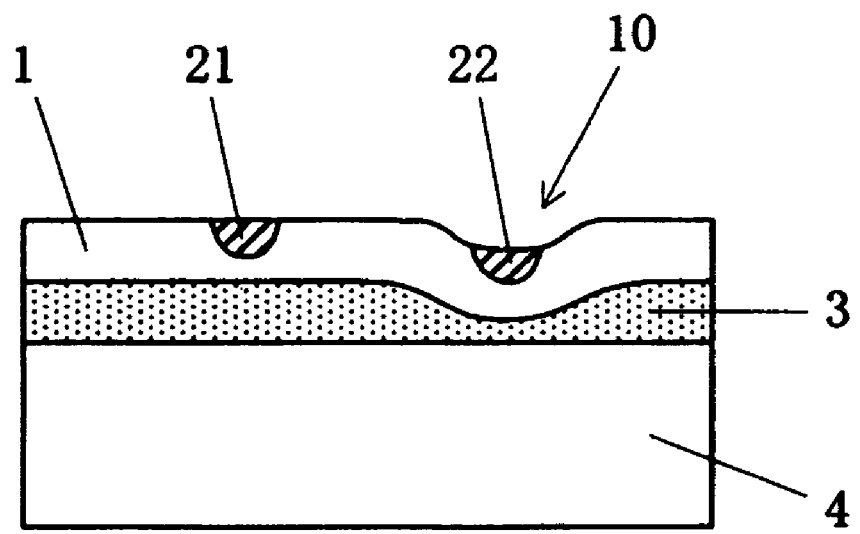
FIG. 2 is a sectional view taken along the line X-X of FIG. 1.

Hereinafter, an optical element according to the invention will be described in detail. FIG. 1 is a plan view of an optical element of the invention. FIG. 2 is a sectional view taken along the line X-X of FIG. 1. The optical element of the invention includes a support substrate 4 and a thin plate 1 of single crystal stacked on the support substrate 4 through a thermoplastic adhesive 3. The optical characteristics of the optical element are regulated by applying stress within an elastic limit to at least a part of the thin plate in a state where the thermoplastic adhesive is softened by heating the optical element, forming a concavo-convex part 10 in the thin plate, and then cooling the optical element to fix the concavo-convex part.

The thin plate 1 should have restoration capability against a pressing force. Specifically, a substrate formed of single crystal is used. Preferably, the thin plate 1 is formed of a material having an electro-optical effect. For example, lithium niobate, lithium titanate, PLZT (lead lanthanum zirconate titanate), a quartz-based material, and a combination thereof may be used. In particular, lithium niobate (LN) or lithium titanate (LT) crystal having a high electro-optical effect is preferably used. The thin plate 1 has a thickness equal to or smaller than 50 μm, and preferably, equal to or smaller than 30 μm. What is important is that the thickness of the thin plate 1 is set such that the adhesive force of the thermoplastic adhesive becomes larger than the restoration force of the thin plate 1 at the concavo-convex part.

To form a thin substrate, like the thin plate 1, one surface of the substrate is polished. When a ridge waveguide is formed in advance at the front surface of the substrate, the rear surface of the substrate is polished. The substrate is polished by applying thermoplastic resin to the surface of the substrate, attaching a polishing jig, and polishing the rear surface of the substrate with a lapping and polishing machine.

The support substrate 4 is bonded to the thin plate 1 through an adhesive layer 3. For the support substrate 4, various materials may be used. For example, the same material as the thin plate may be used, or a material having an electric constant lower than the thin plate, such as quartz, glass, alumina, or the like, may be used. Further, a material having a crystal orientation different from the thin plate may be used. However, it is preferable to select a material having the same thermal expansion coefficient as the thin plate from the viewpoint of stabilization of the operation characteristics of an optical element, such as an optical waveguide type modulator, with respect to change in temperature.

For the adhesive layer 3, a thermoplastic adhesive (Product Name: NOA61, manufactured by Norland Products, Inc.) is used. More preferably, a thermoplastic adhesive having a glass-transition temperature equal to or higher than 60° C. is used. If a low-electric-constant material is used for the adhesive layer, this contributes to the wider bandwidth of an optical element, such as an optical waveguide type modulator.

Before the support substrate 4 is bonded to the substrate before the substrate is thinned or to the thin substrate, an optical waveguide is formed. The optical waveguide 2 may be formed by diffusing Ti or the like on the surface of the substrate (thin plate) by a thermal diffusion method or a proton-exchange method. Though not shown, a control electrode, such as a signal electrode or a ground electrode, may be provided in the thin plate 1 so as to apply an electric field to the optical waveguide, thereby modulating light waves propagating through the optical waveguide. The control electrode may be formed by forming an electrode pattern of Ti or Au on the thin plate 1 or by plating gold on the thin plate 1.

The optical element of the invention has a feature in that the phase or the like of light waves propagating through the thin plate are regulated and various optical characteristics are regulated (optical path length, optical rotation, birefringent induction, and the like are regulated. In the case of an optical modulator, a bias point and the like are regulated) by applying stress within the elastic limit to at least a part of the thin plate 1, and forming the concavo-convex part 10 in the thin plate.

Figure 3:
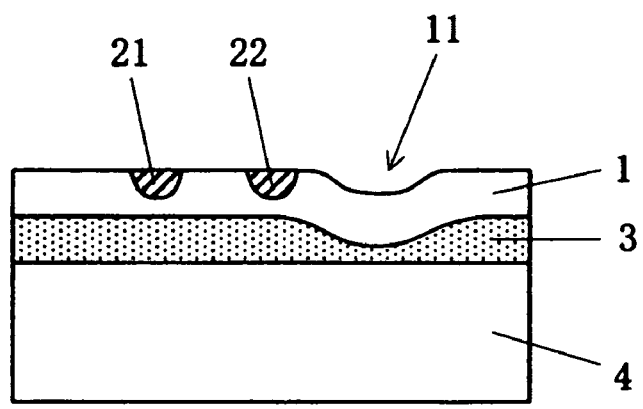
FIG. 3 is a diagram showing another embodiment of the invention corresponding to FIG. 2.

Although FIG. 1 illustrates the Mach-Zehnder type optical waveguide 2, the invention is not limited thereto. Further, in FIG. 1, the concavo-convex part is formed above a branch waveguide 22 constituting the Mach-Zehnder type optical waveguide, but the invention is not limited thereto. As shown in FIG. 3, a concavo-convex part 11 may be formed near the branch waveguide insofar as the concavo-convex part can cause the optical waveguide to be deformed (curved) or stress can be given to the optical waveguide.

Figure 4:
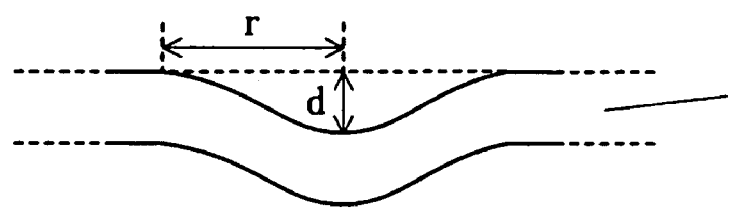
FIG. 4 is a diagram illustrating an adequate size of a concavo-convex part.

As shown in FIG. 4, the depth d or the radius r of the concavo-convex part may be set in various sizes. For example, for bias point control of an optical modulator, it is preferable that change in the phase due to the concavo-convex part is one cycle of light waves (that is, the phase change amount $\delta \leq 1$) for light waves propagating inside the optical waveguide or the thin plate. As described in "Equation 1", when a spatially increased optical path length (Expression (1)) due to the concavo-convex part is calculated, and the relationship between d and r satisfying the condition that the phase change amount $\delta$ of Expression (2) is equal to or smaller than 1, the relationship should satisfy a conditional expression, for example, Expression (3). In the expressions, k is a wave number under vacuum, n is a refractive index, $\delta$ is the amount of change in phase ($=\Delta\lambda/\lambda$).

[Equation 1]

$$\tan\left[\frac{2d}{d^2+r^2}\left(r+\frac{\pi\delta}{kn}\right)\right] = \frac{2rd}{r^2-d^2} \quad (1)$$

$$\delta \leq 1 \quad (2)$$

$$\tan\left[\frac{2d}{d^2+r^2}\left(r+\frac{\pi}{kn}\right)\right] \leq \frac{2rd}{r^2-d^2} \quad (3)$$

Figure 5:
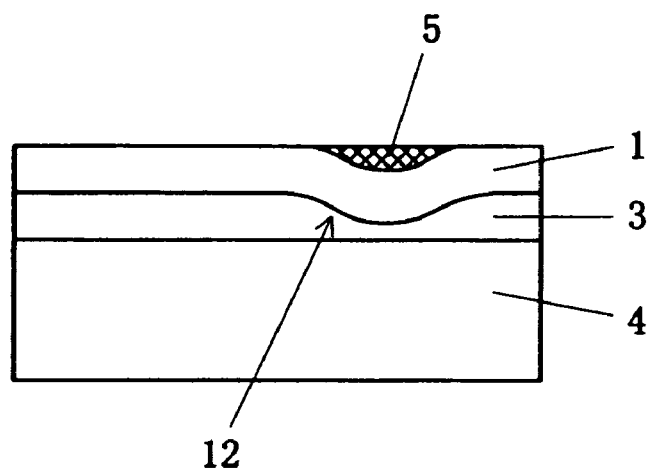
FIG. 5 is a diagram showing an example where fixing means is arranged in a concavo-convex part.

Next, a method of maintaining the concavo-convex part formed in the thin plate will be described. As shown in FIG. 5, fixing means 5 is provided for maintaining the shape of the concavo-convex part formed in the thin plate. When the optical element is being driven, even if the optical element is heated and reaches a temperature at which the thermoplastic adhesive is softened, the fixing means 5 prevents restoration of the concavo-convex part to the original state.

The fixing means 5 is preferably formed of a material having thermoplasticity lower than that of the thermoplastic adhesive or a material having no thermoplasticity. Therefore, even when the thermoplastic adhesive is softened, the shape of the concavo-convex part can be stably maintained since the fixing means has a high softening temperature or the fixing means is not softened.

The fixing means 5 is provided near the concavo-convex part or above the concavo-convex part, as shown in FIG. 5. Therefore, restoration of the concavo-convex part to the original state can be effectively suppressed.

Next, a method of forming the concavo-convex part in the thin plate 1 will be described. First, the optical element is entirely or locally heated to entirely or locally soften the thermoplastic adhesive. As the method of heating the entire optical element, there is a method in which the entire optical element is put in a heating chamber and is heated by a heater provided in a member for holding the optical element. As the method of locally heating the optical element, there is a method in which a heater is provided in a below-described needle for pressing the thin plate, and the optical element is heated through the front end of the needle, or a method in which laser is irradiated separately to heat the optical element.

Next, the thin plate is pressed by a needle having a spherical front end, such that a local concavo-convex part is formed in the thin plate 1. Then, the temperature of the adhesive is reduced in a state where the thin plate is pressed by the needle, and the adhesive is cured while a concavo-convex shape is maintained.

The optical element of the invention has a feature in that the formed concavo-convex part can be easily restored to the original state by heating the thermoplastic adhesive, and thus the concavo-convex part can be repeatedly formed many times to regulate the phase of light waves.

When desired regulation is completed, as shown in FIG. 5, the fixing means is arranged above or near the concavo-convex part to prevent restoration of the concavo-convex part.

Industrial Applicability

As described above, according to the invention, an optical element can be provided which includes a support substrate and a thin plate of single crystal stacked on the support substrate through a thermoplastic adhesive, having the advantages of easily regulating the phase of light waves and restoring the regulated state to the original state.

The invention claimed is:

1. An optical element comprising:
   a support substrate; and
   a thin plate of single crystal stacked on the support substrate through a thermoplastic adhesive,
   wherein the optical characteristics of the optical element are regulated by applying stress within an elastic limit to at least a part of the thin plate in a state where the thermoplastic adhesive is softened by heating the optical element, forming a concavo-convex part in the thin plate, then cooling the optical element to fix the concavo-convex part, and an optical waveguide is formed in the thin plate of single crystal.

2. The optical element according to claim 1, wherein the concavo-convex part is formed above or near the optical waveguide to regulate the optical characteristics.

3. The optical element according to claim 2,
   wherein the optical waveguide is a Mach-Zehnder type optical waveguide.

4. The optical element according to claim 3, wherein the concavo-convex part is arranged near or above two branch waveguides constituting the Mach-Zehnder type optical waveguide so as to regulate the phase of light propagating through the branch waveguides.

5. An optical element comprising:
   a support substrate; and
   a thin plate of single crystal stacked on the support substrate through a thermoplastic adhesive,
   wherein the thin plate has a thickness equal to or smaller than 50 μm,
   stress within an elastic limit is applied to at least a part of the thin plate,
   a circular concavo-convex part having a radius r and a depth d is formed, and the shape of the concavo-convex part satisfies the condition of the following expression:

$$\tan[2d/(d^2+r^2) \times (r+\pi/kn)] \leq 2rd/(r^2-d^2)$$

wherein k is a wave number under vacuum, and n is a refractive index.

6. An optical element comprising:
   a support substrate: and
   a thin plate of single crystal stacked on the support substrate through a thermoplastic adhesive
   wherein the optical characteristics of the optical element are regulated by applying stress within an elastic limit to at least a part of the thin plate in a state where the thermoplastic adhesive is softened by heating the optical element, forming a concavo-convex part in the thin plate, then cooling the optical element to fix the concavo-convex part, and further comprising:
   fixing means for maintaining the shape of the concavo-convex part formed in the thin plate of single crystal,
   wherein the fixing means is formed of a material having thermoplasticity lower than that of the thermoplastic adhesive or a material having no thermoplasticity, and an optical waveguide is formed in the thin plate of single crystal.

7. An optical element comprising:
   a support substrate: and
   a thin plate of single crystal stacked on the support substrate through a thermoplastic Adhesive,
   wherein the optical characteristics of the optical element are regulated by applying stress within an elastic limit to at least a part of the thin plate in a state where the thermoplastic adhesive is softened by heating the optical element, forming a concavo-convex part in the thin plate, then cooling the optical element to fix the concavo-convex part, and further comprising:
   fixing means for maintaining the shape of the concavo-convex part formed in the thin plate of single crystal,
   wherein the fixing means is formed of a material having thermoplasticity lower than that of the thermoplastic adhesive or a material having no thermoplasticity, the fixing means is provided in contact with the concavo-convex part or above the concavo-convex part, and an optical waveguide is formed in the thin plate of single crystal.

* * * * *